US011169969B2

(12) United States Patent
Arneja et al.

(10) Patent No.: US 11,169,969 B2
(45) Date of Patent: *Nov. 9, 2021

(54) CLUSTER FILE REPLICATION

(71) Applicant: Arista Networks, Inc., Santa Clara, CA (US)

(72) Inventors: Gagandeep Arneja, Santa Clara, CA (US); Justin Costa-Roberts, Cupertino, CA (US); Andre Pech, Santa Clara, CA (US); Hua Zhong, Santa Clara, CA (US); Arturo Escaip, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,666

(22) Filed: Mar. 2, 2020

(65) Prior Publication Data

US 2020/0242083 A1 Jul. 30, 2020

Related U.S. Application Data

(63) Continuation of application No. 15/296,851, filed on Oct. 18, 2016, now Pat. No. 10,621,145.

(51) Int. Cl.
*G06F 16/178* (2019.01)
(52) U.S. Cl.
CPC .................... *G06F 16/178* (2019.01)
(58) Field of Classification Search
CPC ...... G06F 16/285; G06F 16/178; G06F 16/93; G06F 16/273; G06F 16/275
(Continued)

(56) References Cited

U.S. PATENT DOCUMENTS

| 4,710,917 A | 12/1987 | Tompkins et al. |
| 7,190,686 B1 | 3/2007 | Beals |

(Continued)

FOREIGN PATENT DOCUMENTS

JP 2007-018026 A 1/2007

OTHER PUBLICATIONS

European Patent Office, Extended European Search Report, EP Application No. 17803632.3, dated Oct. 11, 2019, 8 pages.
(Continued)

*Primary Examiner* — Dung K Chau
(74) *Attorney, Agent, or Firm* — Fountainhead Law Group P.C.

(57) ABSTRACT

A cluster file replication system is provided. Each controller of the plurality of controllers is configured to access a filesystem having a plurality of files including a system database of a controller having state information of the plurality of controllers. Each controller is further configured to have one or more service agents. The one or more service agents of each controller is configured to respond to one of the plurality of controllers becoming a master controller of the cluster. The one or more service agents of each controller is configured to set up one or more objects that react to the state information and coordinate replication of changes to the files, system database and state information from the master controller to follower controllers in the cluster. The one or more objects on each of the follower controllers is supportive of the follower controllers receiving the changes but disabled from initiating the replication. A method for cluster file replication is also provided.

20 Claims, 6 Drawing Sheets

(58) Field of Classification Search
USPC .................. 707/623, 626, 837, 737, 999.204
See application file for complete search history.

(56) References Cited

U.S. PATENT DOCUMENTS

| | | | |
|---|---|---|---|
| 7,320,088 B1 | 1/2008 | Gawali | |
| 7,483,370 B1 | 1/2009 | Dayal | |
| 7,836,017 B1 | 11/2010 | Srinivasan et al. | |
| 8,296,527 B2 | 10/2012 | Xu et al. | |
| 8,359,112 B2 | 1/2013 | Kephaet et al. | |
| 8,582,422 B2 | 11/2013 | Mongeau | |
| 8,676,760 B2 | 3/2014 | Shen et al. | |
| 9,104,643 B2 | 8/2015 | DeCusatis et al. | |
| 9,432,252 B2 | 8/2016 | Koponen et al. | |
| 9,817,721 B1* | 11/2017 | Youngworth | ....... G06F 11/2092 |
| 2006/0126501 A1 | 6/2006 | Ramaswamy | |
| 2007/0168058 A1 | 7/2007 | Kephart et al. | |
| 2008/0022148 A1 | 1/2008 | Barnea et al. | |
| 2008/0126846 A1 | 5/2008 | Vivian et al. | |
| 2010/0257149 A1 | 10/2010 | Cognign et al. | |
| 2011/0078490 A1 | 3/2011 | He | |
| 2011/0116362 A1 | 5/2011 | Singatwaria | |
| 2011/0119453 A1 | 5/2011 | Xu et al. | |
| 2011/0125906 A1* | 5/2011 | Chunilal | ............ G06Q 30/0251 709/226 |
| 2012/0260120 A1 | 10/2012 | Mongeau | |
| 2012/9257491 | 10/2012 | Mongeau | |
| 2013/0132854 A1* | 5/2013 | Raleigh | .................. H04W 4/60 715/738 |
| 2014/0032495 A1 | 1/2014 | Erofeev | |
| 2015/0009800 A1 | 1/2015 | Koponen et al. | |
| 2015/0009804 A1 | 1/2015 | Koponen et al. | |
| 2015/0010012 A1 | 1/2015 | Koponen et al. | |
| 2015/0339200 A1 | 11/2015 | Madduri | |
| 2016/0044035 A1* | 2/2016 | Huang | ................ H04L 41/0806 726/4 |
| 2016/0044635 A1 | 2/2016 | Huang | |
| 2016/0259836 A1 | 9/2016 | Heathorn et al. | |

OTHER PUBLICATIONS

Patent Cooperation Treaty, International Preliminary Report on Patentability and International Search Report, International Application No. PCT/US2017/057036, Apr. 23, 2019.

European Patent Office, European Office Action, EP Application No. 17803632.3, dated Feb. 23, 2021, 6 pages.

International Search Report and Written Opinion, PCT Application No. PCT/US2017/034573, filed May 25, 2017, dated Aug. 24, 2017, 11 pages.

European Patent Office, Extended European Search Report, EP Application No. 17862186.8, dated Jun. 24, 2020, 13 pages.

* cited by examiner

CLUSTER FILE REPLICATION

CROSS-REFERENCE TO RELATED APPLICATION

The present application is a continuation of U.S. application Ser. No. 15/296,851, filed Oct. 18, 2016, entitled "Cluster File Replication." The entire contents of this application are incorporated herein by reference for all purposes.

BACKGROUND

Data coherency across multiple controllers in a cluster is vital for reliable operation. If one controller loses a database or a file, or ceases operation, the database or file could be rebuilt, or the controller could be rebooted, but the system state and various pieces of data could change meanwhile. In network controllers, mappings of virtual networks should be persisted, but can experience loss of data coherency under the above conditions. In high-availability controller clusters, a switchover from master to follower could incur delays if data has lost coherency and has to be downloaded again or reconstructed. There is also a problem of determining which controller should be a source for data replication, when the master can change under various conditions. A blanket policy of frequent data copying, if not well-coordinated, could result in chaotic data. Also, frequent data copying consumes system and processor bandwidth. File deletion, under data replication, can be problematic. Therefore, there is a need in the art for a solution which overcomes the drawbacks described above.

SUMMARY

In some embodiments, a cluster file replication system is provided. Each controller of a plurality of controllers of the system is configured to access a filesystem having a plurality of files including a system database of a controller having state information of the plurality of controllers. Each controller is further configured to have one or more service agents. The one or more service agents of each controller is configured to respond to one of the plurality of controllers becoming a master controller of the cluster. The one or more objects on each of the follower controllers is supportive of the follower controllers receiving the changes but disabled from initiating the replication.

In some embodiments, a tangible, non-transitory, computer-readable media having instructions thereupon which, when executed by one or more processors in a cluster of controllers, cause the one or more processors to perform a method. The method includes writing, by one controller in the cluster, state information to a system database of the one controller to record that the one controller is a master controller. The method includes establishing, by one or more service agents of each controller in the cluster, one or more objects in the controller that are reactive to the state information. The method includes coordinating, by the one or more objects established in the master controller and enabled in reaction to the state information, replication of change to files, the system database or the state information from the master controller to follower controllers, such that the one or more objects on each of the follower controllers supports receiving the replication of change but is disabled, in reaction to the state information, from initiating the replication of change.

In some embodiments, a method for cluster file replication, performed by controller members of a cluster is provided. The method includes updating, by a controller that is a member of the cluster, state information in a system database of the controller to indicate the controller is a master controller, and establishing, by one or more service agents of each controller, one or more objects in the controller that react to the state information. The method includes coordinating, by the one or more objects in the master controller enabled in reaction to the state information, replication of changes to files, the system database and the state information from the master controller to follower controllers. The method includes disabling, by the one or more objects in each of the follower controllers in reaction to the state information, initiation by the follower controllers of such replication, while being supportive of the follower controllers receiving such changes.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Cluster file replication, as presented herein in various embodiments, synchronizes files between cluster members. Files are synchronized from the cluster leader, a master controller, to followers, i.e., follower controllers. Service agents, for example a license manager, use the below-described mechanisms to make sure that any state stored on the filesystem is persisted across the cluster and available on the new leader or master if there is a leader or master switchover. Files to be kept in sync are registered with the cluster by a service agent. Whenever a file changes on the leader, i.e., the master controller, the changes are propagated to the followers, i.e., the follower controllers, without further intervention from the service agent that set up the replication mechanism. Likewise, system state, which the master can change, is persisted and available on the followers as well. Embodiments are described below, first with reference to a cluster of network controllers, and then genericized to controllers in a cluster that persists data and system state across the cluster, which could be applicable to various systems that use multiple controllers. Controllers described herein solve the technical problem of recognizing who is the master and then replicating data transparently.

Figure 1:
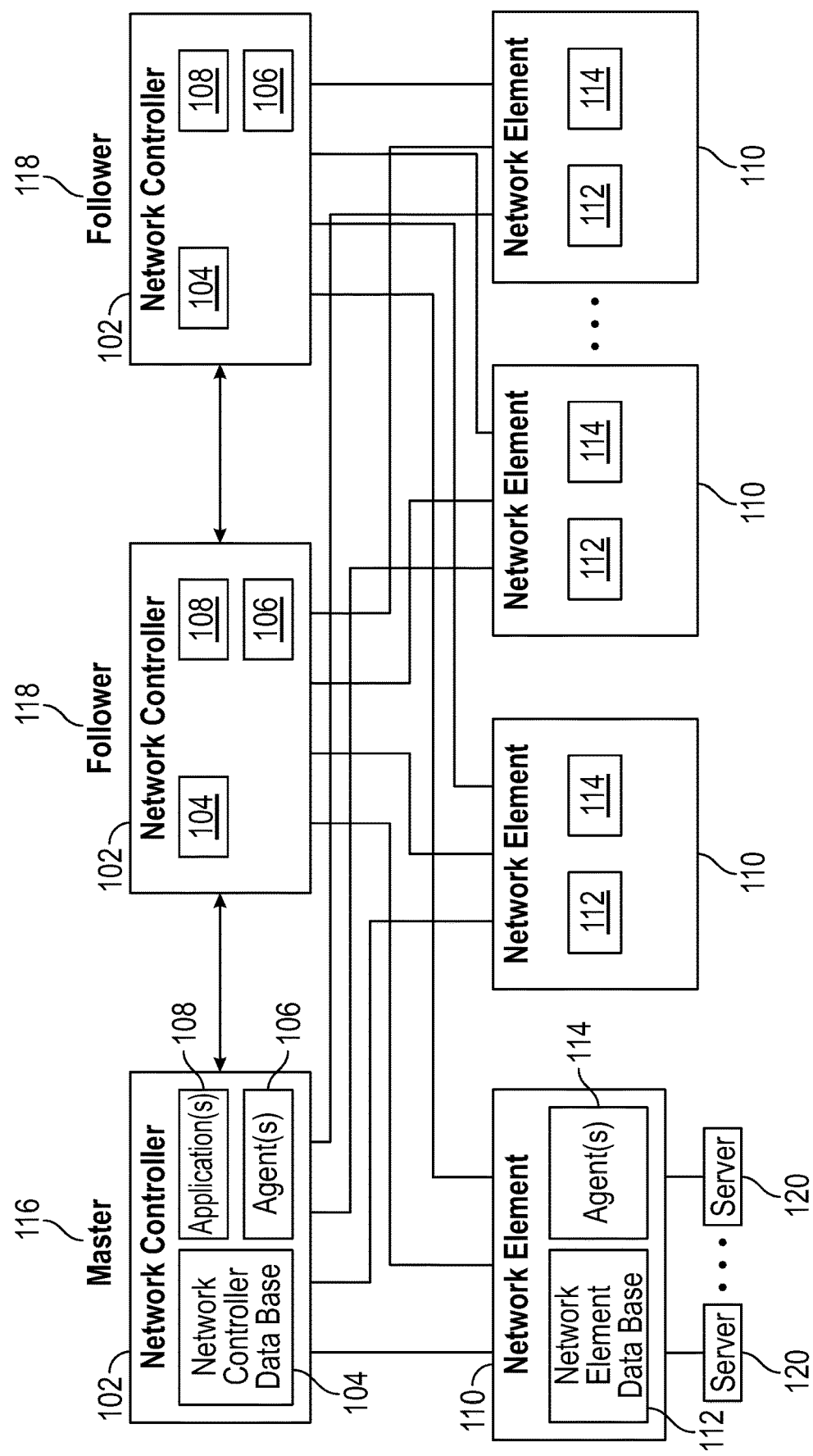
FIG. 1 is a system diagram of a cluster of network controllers, with network elements, showing use of a high-availability controller.

FIG. 1 is a system diagram of a cluster of network controllers 102, with network elements 110, showing use of a high-availability controller 102. One of the controllers 102 is a master 116, the others are followers 118. Each controller has a network controller database 104, which is kept coherent across the controllers 102 and across the network elements 110, each of which has a network element database 112. Each network element 110 could have one or more servers 120 coupled to it, or not, depending upon the function(s) of that network element 110. Applications 108 in the master 116 network controller 102 are typically network-related and are used for setting up, configuring and managing a network or multiple virtual networks formed by the network elements 110. These applications 108 can make changes to various files and/or to the network controller database 104. The network controllers 102 have elected one of the network controllers 102 as the master 116 or master network controller 102, and the others are followers 118 or follower network controllers 102. Embodiments of the controller 102, as further described below, keep the network controller database 104 and other files, as well as the system state, coherent across the controllers 102. If the master network controller 102 drops out temporarily or permanently, e.g. due to any of a variety of failures, the remaining controllers 102 elect a new master 116, which takes up operation using the coherent state and coherent data. The cluster of network controllers 102 cooperating with network elements 110 as shown in FIG. 1 is but one example of a suitable environment for the controllers 102 described with reference to FIGS. 2-6, and further systems for these controllers 102 are readily envisioned.

Figure 2:
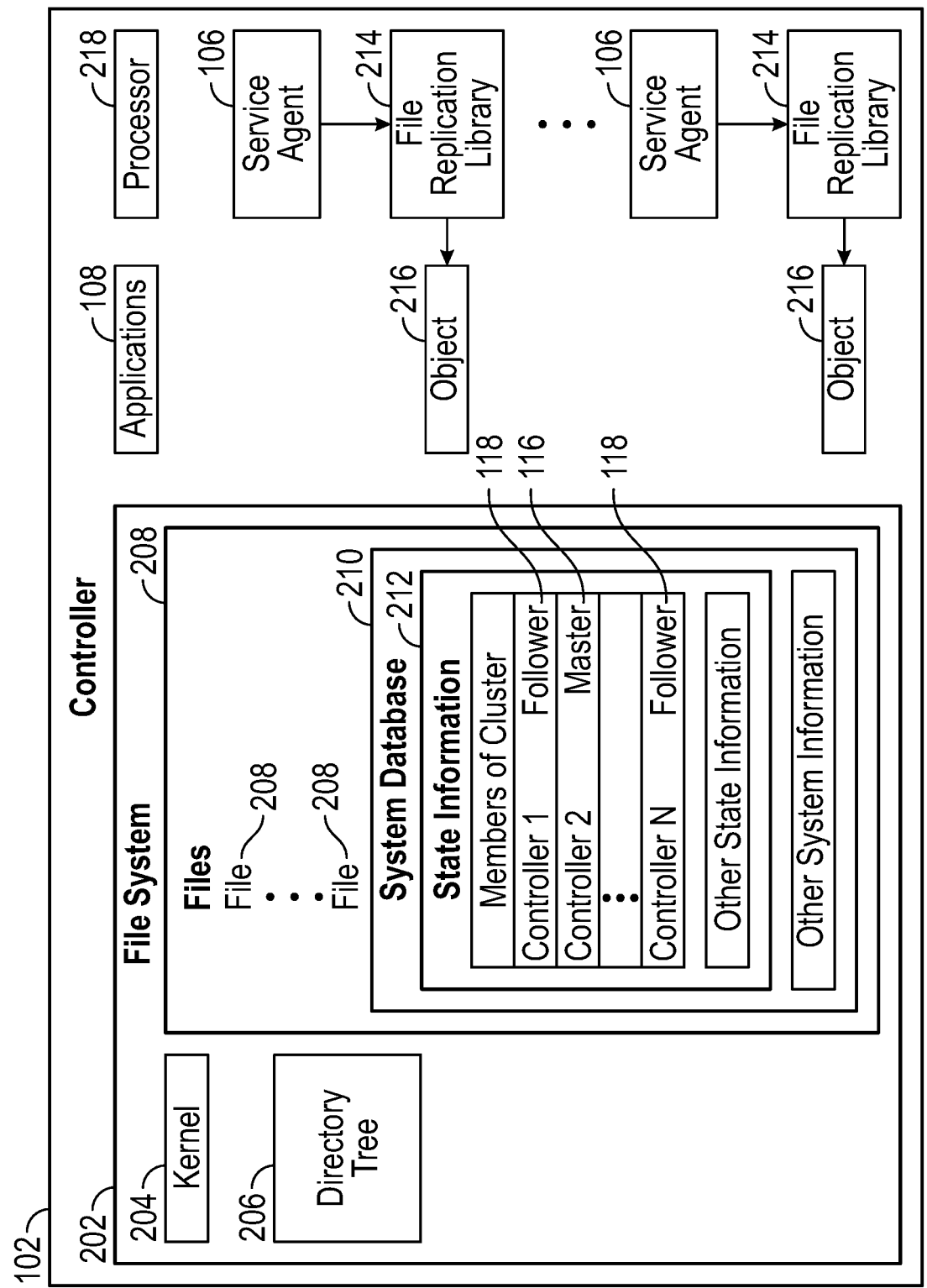
FIG. 2 is a block diagram of a high-availability controller that has a filesystem, one or more applications and one or more service agents that instantiate objects from a file replication library to coordinate replication of system changes from a master controller to follower controllers in systems such as shown in FIGS. 1 and 3-5.

FIG. 2 is a block diagram of a high-availability controller 102 that has a filesystem 202, one or more applications 108 and one or more service agents 106 that instantiate objects 216 from a file replication library 214 to coordinate replication of system changes from a master 116 controller 102 to follower 118 controllers 102 in systems such as shown in FIGS. 1 and 3-5. The processor 218 could be one or more physical processors in a physical controller 102, or could be threaded or time sliced from one or more processors 218 in a virtualized system implemented with physical computing components. Each controller 102, whether a master 116 or a follower 118, has or has access to files 208 including a system database 210, which are accessed using a directory tree 206 through the kernel 204 of the filesystem 202. The system database 210 has various kinds of state information 212, including indications of which controllers are members of the cluster, and for each such controller, whether that controller 102 is a master 116 or a follower 118. This and other state information 212 and other system information can be represented in various formats as readily devised. In some embodiments, each service agent 106 has a file replication library 214, from which the service agent can instantiate one or more objects 216, according to any of various addressing schemes or spaces as readily devised. In further embodiments, there is a single file replication library 214 on each controller 102, from which each service agent 106 can instantiate one or more objects 216. Interactions of agents 106, objects 216 and kernels 204 in master 116 and follower 118 controllers 102, for cluster file replication in a controller-based system, are further described below.

Various components in the controller 102 can be implemented in software executing on the processor 218 and/or as structures in memory in the controller 102. Further components can be implemented in firmware or hardware. In virtualized systems, the controller 102 can be implemented with physical computing components. Software code, in some embodiments, for object(s) 216 instantiated by one service agent 106 could be in the address space of the service agent 106, or in another agent 106, or elsewhere in memory.

Figure 3:
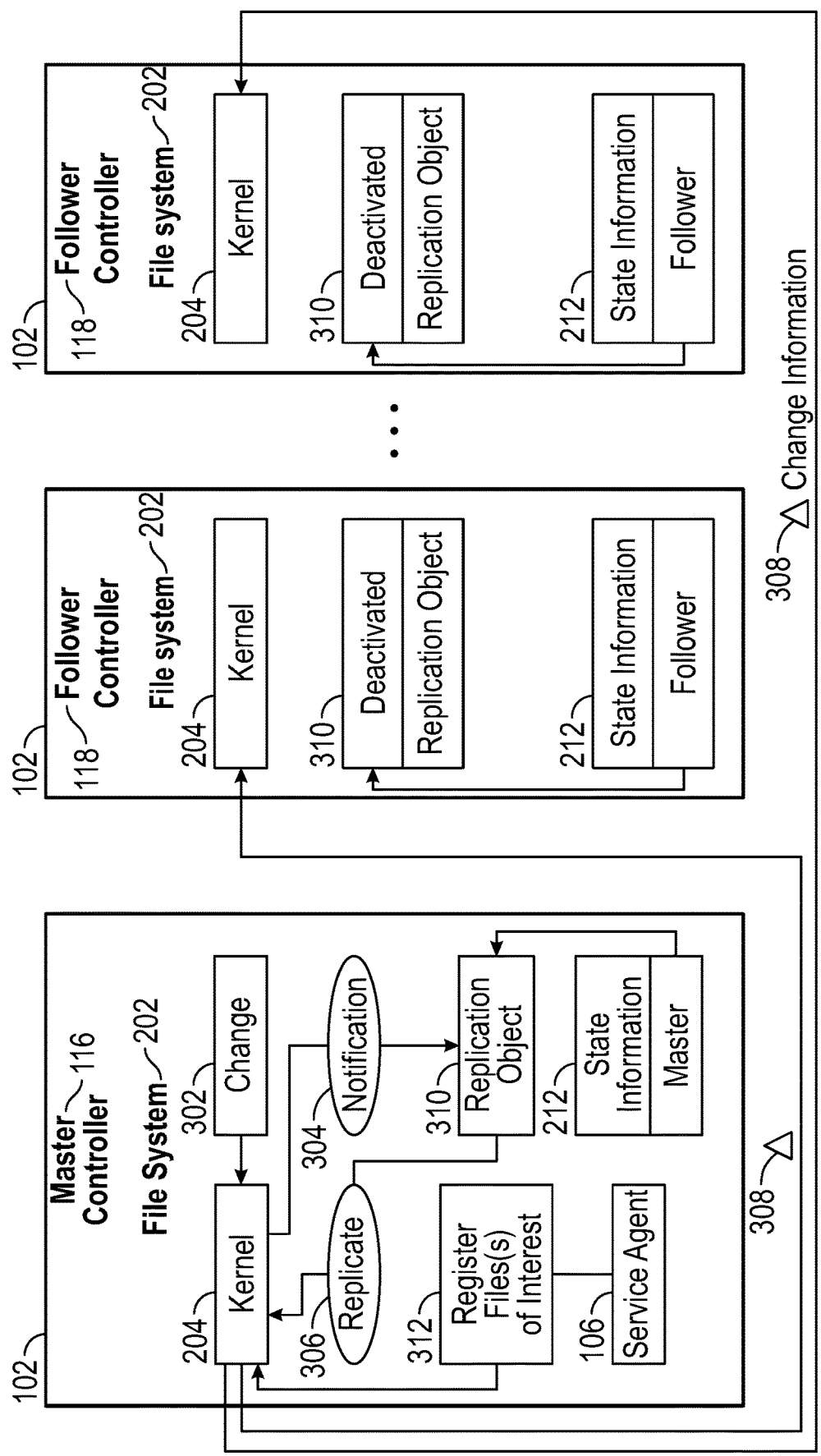
FIG. 3 is a system diagram depicting a replication object in a master controller coordinating with the filesystem to replicate changes of files, system database and/or state information from the master controller to follower controllers in a cluster.

FIG. 3 is a system diagram depicting a replication object 310 in a master 116 controller 102 coordinating with the filesystem 202 to replicate changes 302 of files 208, system database 210 and/or state information 212 from the 116 master controller 102 to follower 118 controllers 102 in a cluster. The replication object 310 is instantiated by a service agent 106, from a file replication library 214. Further replication objects 310 could be instantiated by the same service agent 106, or by other service agents 106. The service agent 106 that instantiated the replication object 310 registers one or more files or directories of interest 312, and the corresponding replication object 310, with the kernel 204 of the filesystem 202. This action informs the kernel 204 to watch for changes to the one or more files or directories of interest 312.

The master controller 116 can make various changes 302 that affect the system state of the controller 102. Examples include writing a file (e.g., this could include writing an entire new file or writing a portion of a file), deleting a file, writing state information 212 to the system database 212 (which is a type of file write), etc. A new master 116, upon being elected by the controllers 102, updates the state information 212 to indicate that it has become the master 116. A master 116 controller 102, upon being informed or otherwise discovering that a controller 102 has joined the cluster as either a new controller 102 or a recovered controller 102 that had previously failed, updates the state information 212 to so indicate. The master 112 can also write to the state information 212 to indicate that a controller 102 is no longer a member of the cluster (e.g., that controller 102 has failed), or to indicate that a controller 102 that was formerly a master 112 is now a follower 118 (e.g., when the new master 112 takes over). Applications 108 executing on the master 116 controller 102 can also write, delete or update files. Service agents 106 executing on the master 116 controller 102 can write, delete or update files.

When the kernel 204 of the filesystem 202 of a master 116 controller 102 detects, perceives or is informed of a change 302 in the filesystem 202 (e.g., a file write, file move or file deletion), if this matches the registering of the file(s) or directory/directories of interest 312, the kernel 204 sends the appropriate notification 304 to the appropriate replication object 310 on the master 116 controller 102. That replication object 310 sends a replicate request 306 (also called a synchronize request) to the kernel 204 on the master 116 controller 102. Upon receiving a replicate request 306, the kernel 204 on the master 116 controller 102 sends change information 308, symbolized in the drawing by the Greek symbol "delta", to each of the follower 118 controllers 102.

The kernel 204 of the filesystem 202 of the master 116 controller 102 cooperates with the kernels 204 in the filesystems 202 in each of the followers 118 to deliver the change information 308, which synchronizes the file(s) or directory/directories of interest 312 from the master 116 controller 102 to the follower 118 controllers 102.

In the followers 118, the replication objects 310 are deactivated from initiating replication, but are supportive of the follower 118 controller 102 receiving the change information 308 (e.g., the replication objects 310 do not interfere). Behavior in each of the controllers 102, for the replication objects 310 and service agents 106, is reactive to the state information 212. And, using the above mechanisms, the state information 212 is synchronized across the controllers 102. So, replication object(s) 310 in the master 116 controller 102 are enabled to initiate replication in reaction to the state information 212 indicating that they are on the master 116 controller 102, and are responsive to notification 304. Replication object(s) 310 in each of the follower 118 controllers 102 are disabled from initiating replication, in reaction to the state information 212 indicating they are on follower 118 controllers 102, and are unresponsive to any notifications 304. By linking the behavior of the replication objects 310 to the state information 212, which is coherent across the master 116 and follower(s) 102, the flow of replication of change 302 only from master 116 to follower(s) 118, and not vice versa, is assured. This flow direction changes when a new master 116 is elected, and the new master propagates the state information 212 accordingly, while the system continues to have coherence of data and state under the new master 116.

Various utilities and commands in various operating systems could be used to implement aspects of the interactions among the components of a controller-based cluster. For example, in Linux, inotify and rsync are used in some embodiments. As a Linux kernel subsystem, inotify (meaning inode notify) notices changes to a file system and reports the changes to applications. To use inotify, the application registers with the filesystem 202 kernel 204 the file(s) or directory/directories for which notification is desired, and the kernel 204 sends a notification to the application whenever there is a change to the file or files or directory or directories. Depending on specific syntax for commands or utilities in a specified operating system, the notification request could be a combined command for all of the files or directories of interest, or a single command for each file or directory. In some embodiments, replication objects 310 are the applications that get an inotify or other notification, which triggers the replication. This is preferred, so that the replication objects 310 can operate independently of the service agents that instantiated them, and service agent 106 intervention is not required for coherent file replication in the cluster. However, in further embodiments, service agents 106 are the applications that get an inotify or other notification, which triggers the replication. This latter approach supports coherent file replication in the cluster, with ongoing service agent 106 involvement.

As a Linux utility, rsync is both a file synchronization and file transfer program, which can be used to synchronize files and/or directories between different systems. The source system connects to the destination system, and the two systems determine what parts of a file need to be transferred. An rsync request, made on a command line, specifies a source including a file or files or directory or directories in the source, and a destination file or files or directory to which to copy. In some embodiments, the replication is performed using rsync. Other operating systems and other commands or utilities for replication are readily applied in further embodiments.

One mechanism for ensuring there is no corruption during the replication is to copy a file to a destination under a different, temporary filename, then once the file is completely copied to the destination, the temporary file is renamed thus moving the temporary file to the target under the desired filename. The renaming operation is an atomic rename of the file to the actual destination file, and is an existing implementation or mechanism in some operating systems. With this mechanism, if the master 116 crashes during the middle of replication, the file might otherwise have been corrupted in the follower 118, but this only corrupts the temporary file instead, and either the recovering master 116 or a new master 116 can then take over and recover the system correctly.

As part of replication, if the file is in the filesystem 202 of the master 116 controller 102, the rsync or other replicate request 306 synchronizes from the master 116 to the follower(s) 118. If a file has been deleted on the master 116, there is a file delete on the follower(s) 118. One way to service both of these possibilities is to use an inotify and treat this as a dirty flag, then check the filesystem 202 to see if the file actually exists, and determine actions accordingly.

In some embodiments, an entire directory in which a file of interest resides is being monitored, so there are updates for all of the files in that directory. Filenames of interest are tracked, and any updates of files not of interest are discarded. With this specificity applied to replication, only the files of interest are synchronized across the system, and system and processor bandwidth are not spent on replicating files that are not of interest. This improves operating efficiency of the system.

In some embodiments, the system database 210 is in charge of sending updates to the service agents 106 whenever the state changes. For example, a service agent 106 on the master 116 controller 102 could write to the system database 210 to change the state information 212, which triggers an update, and the system database 210 knows which other service agents 106 are listening for states and will send updates to those service agents 106.

A system based on the controllers 102 has fault tolerance in that a controller 102 can go off-line, then return, and the system updates the state information 212 in that controller 102. The controller 102 reacts to the coherent state information 212 as described above, and thus does not operate out of synchrony with the other controllers 102, even though that returning controller 102 has not directly experienced system operation or system state changes while the controller 102 was non-functioning.

Figure 4A:
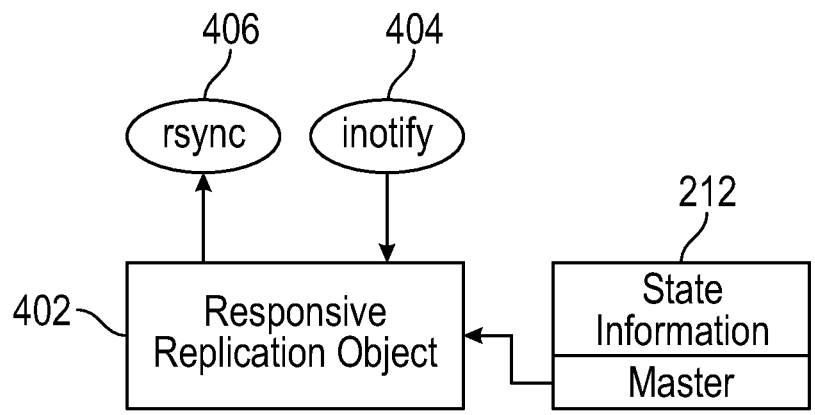
FIG. 4A shows an embodiment of a responsive replication object suitable for use as the replication object in FIG. 3.

FIG. 4A shows an embodiment of a responsive replication object 402 suitable for use as the replication object 310 in FIG. 3. In this version, each time the responsive replication object 402 receives an inotify 404 (or other notification 304), the responsive replication object 402 sends out an rsync 406 or other replicate request 306. Filesystem 202 synchronization from master 116 to follower(s) 118 thus occurs with every change 302 of interest (i.e., change affecting the registered file(s) or directory/directories of interest 312) detected by the kernel 204.

However, in some systems this may result in too frequent updates and excessive load on the network just to replicate files. This also may not scale well to larger systems. As a solution to these problems, the updates that occur during a specified time interval could get collapsed into one periodic update, as described below.

Figure 4B:
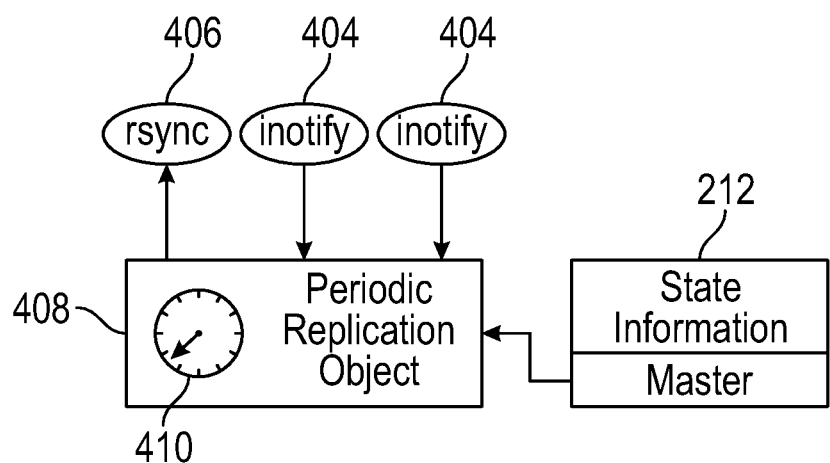
FIG. 4B shows an embodiment of a periodic replication object suitable for use as the replication object in FIG. 3.

FIG. 4B shows an embodiment of a periodic replication object 408 suitable for use as the replication object 310 in FIG. 3. A timer 410, which could be specific to the periodic replication object 408, or could be based on intervals on a system timer, etc., establishes a time interval, which could be fixed, or programmable, or variable. During the time interval, if one or more inotify 404 or other notification(s) 304 arrive, the periodic replication object 108 is primed and issues an rsync 406 or other replicate request 306 upon completion or expiration of the time interval. If there are no notifications 304 during the time interval, there is no replicate request 306 at the end of the time interval. Example time intervals or rates could be once per second, once per ten seconds, etc. In a further embodiment, the notifications 304 could be counted, and the replicate request 306 sent upon reach of a specified count, or time interval, whichever comes first. Further variations are readily devised in keeping with the teachings herein.

Figure 5:
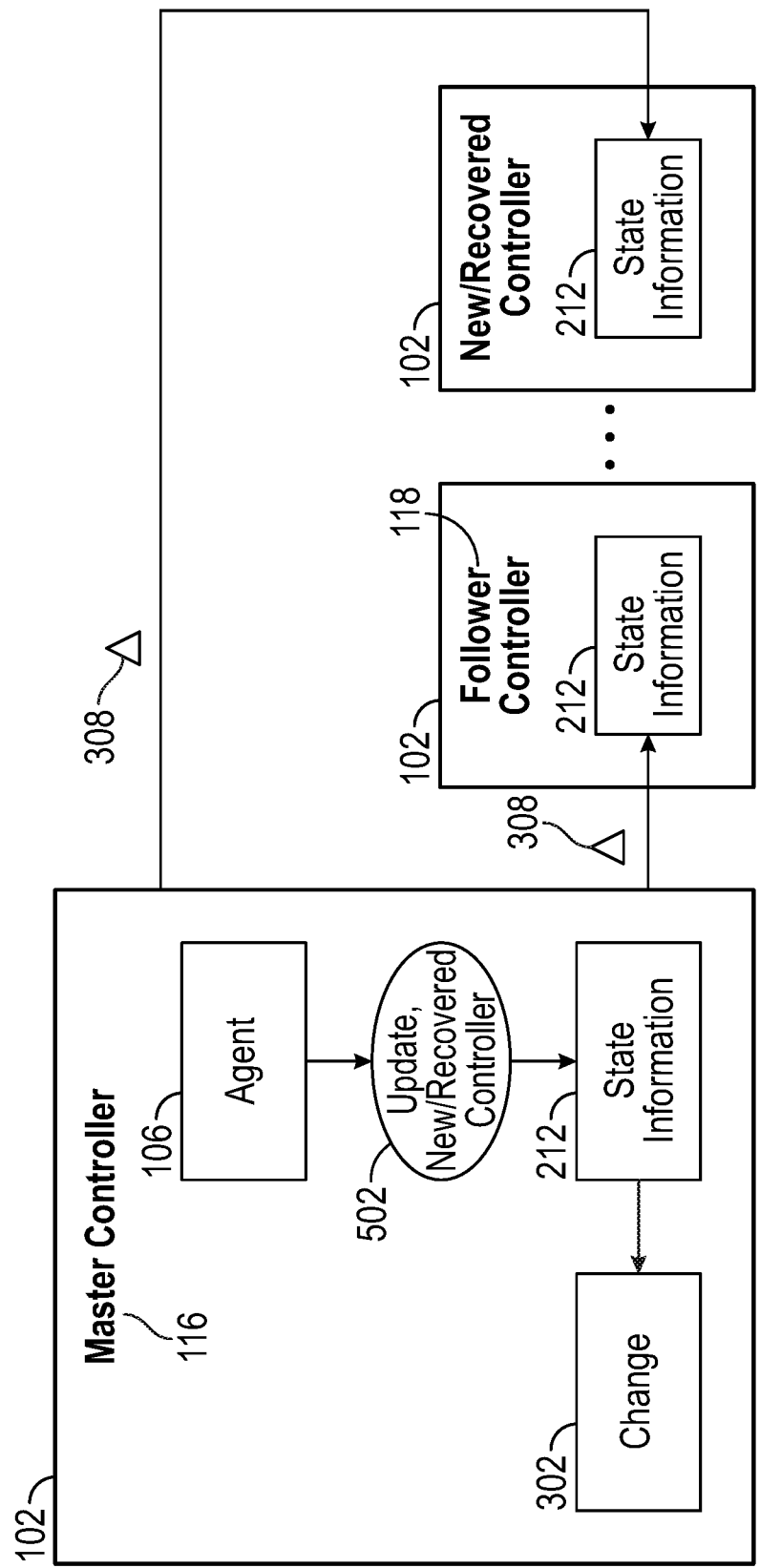
FIG. 5 depicts a controller joining the cluster, and propagation of updated state information as a result.

FIG. 5 depicts a controller 102 joining the cluster, and propagation of updated state information 212 as a result. In this scenario, the new or recovered controller 102 joins the cluster and communicates its presence, e.g., by sending a message such as an announcement, a greeting or an inquiry to other controllers 102, or by responding to another controller 102, or by issuing a heartbeat, etc. An agent 106 on the master 116 controller 102 detects that the new or recovered controller 102 has joined the cluster, e.g., by receiving the message from the new or recovered controller 102, and sends an update 502 for the new or recovered controller 102 to the state information 212. A change 302 in the state information 212 is detected, as illustrated in FIG. 3. Because of the change 302, the change information 308 is propagated from the master 116 to the followers 118, which now includes the follower 118 controller 102 already present in the cluster and the new or recovered controller 102. All controllers 102 then have consistent, coherent state information 212 showing which controller 102 is the master of 116, and which controller(s) 102 are the followers 118. The scenario depicted in FIG. 5 (and FIG. 3) can also be used to illustrate what happens when a new master 116 is elected among the controllers 102, and, as part of the switchover, a similar process of that master 116 updating the state information 212 and propagating the change information 308 to the followers 118 occurs.

Figure 6:
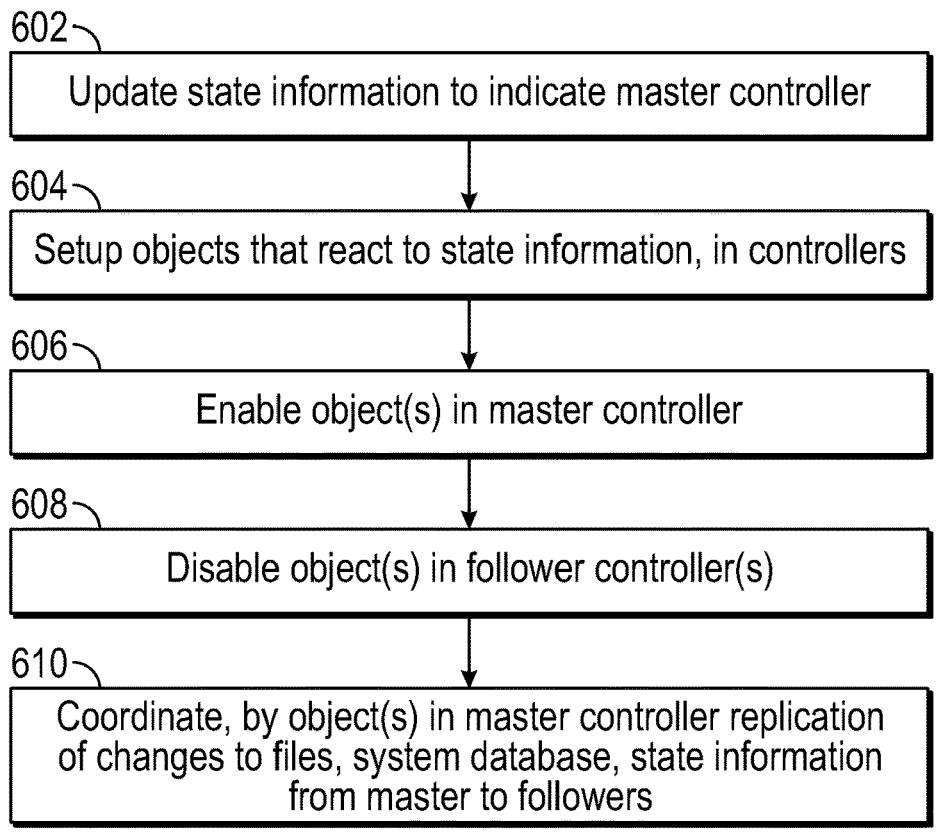
FIG. 6 is a flow diagram of a method for cluster file replication, which can be performed by controller members of a cluster, including embodiments shown in FIGS. 1-5 and variations thereof.

FIG. 6 is a flow diagram of a method for cluster file replication, which can be performed by controller members of a cluster, including embodiments shown in FIGS. 1-5 and variations thereof. Steps or actions in the method can be performed by a processor, such as a processor in or of the controller.

In an action 602, state information is updated to indicate a master controller. For example, a controller, upon being elected by controllers in a cluster, could write to state information in a system database in that controller to indicate that it is the master controller, and other controllers that are members of the cluster are follower controllers.

In an action 604, objects are set up that react to state information, in the controllers. For example, in each controller in the cluster, one or more service agents could set up one or more replication objects that are reactive to state information.

In an action 606, one or more objects in the master controller are enabled. These could be the replication object or objects, and they are enabled in reaction to the state information indicating that they are on the master controller.

In an action 608, one or more objects in each of the follower controllers are disabled. These could be replication objects, and they are disabled in reaction to the state information indicating they are on follower controllers.

In an action 610, replication of changes to files, system database, state information etc. is coordinated by one or more objects in the master controller. The replication of changes proceeds from the master to the followers. For example, a replication object in the master controller, reactive to the state information indicating it is on the master controller, could receive a notification from the kernel of a change to a file or directory of interest which the master controller (e.g., an agent, or the replication object) has registered with the kernel, and respond by issuing a replication request to the kernel. The kernel of the master controller could then replicate the changes, by sending change information from the master controller to the follower controllers. In this manner, files, directories and state information are replicated and kept coherent across all of the controllers.

Figure 7:
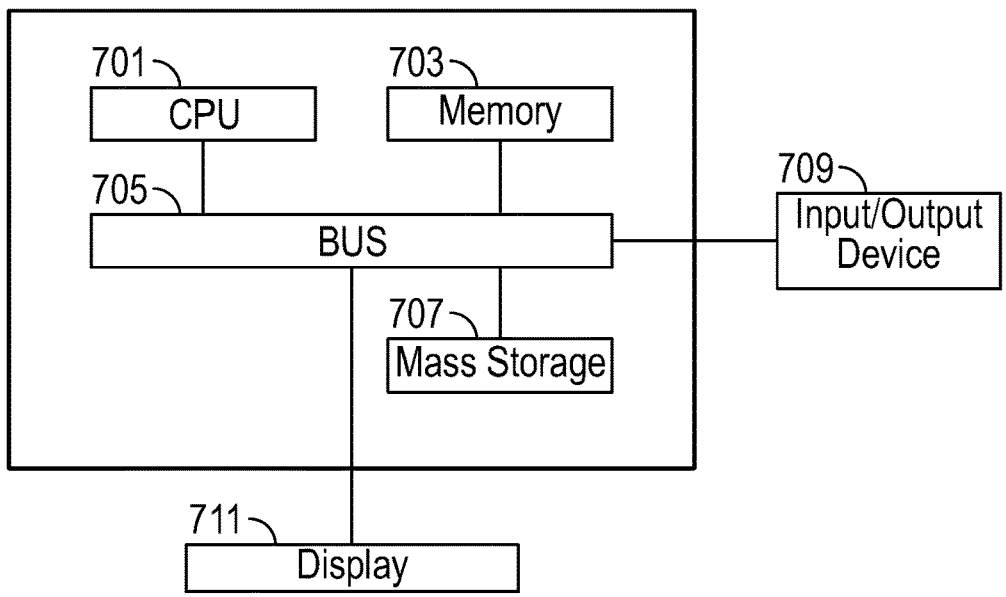
FIG. 7 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments described herein. The computing device of FIG. 7 may be used to perform embodiments of the functionality for cluster file replication in accordance with some embodiments. The computing device includes a central processing unit (CPU) 701, which is coupled through a bus 705 to a memory 703, and mass storage device 707. Mass storage device 707 represents a persistent data storage device such as a floppy disc drive or a fixed disc drive, which may be local or remote in some embodiments. The mass storage device 707 could implement a backup storage, in some embodiments. Memory 703 may include read only memory, random access memory, etc. Applications resident on the computing device may be stored on or accessed via a computer readable medium such as memory 703 or mass storage device 707 in some embodiments. Applications may also be in the form of modulated electronic signals modulated accessed via a network modem or other network interface of the computing device. It should be appreciated that CPU 701 may be embodied in a general-purpose processor, a special purpose processor, or a specially programmed logic device in some embodiments.

Display 711 is in communication with CPU 701, memory 703, and mass storage device 707, through bus 705. Display 711 is configured to display any visualization tools or reports associated with the system described herein. Input/output device 709 is coupled to bus 705 in order to communicate information in command selections to CPU 701. It should be appreciated that data to and from external devices may be communicated through the input/output device 709. CPU 701 can be defined to execute the functionality described herein to enable the functionality described with reference to FIGS. 1-6. The code embodying this functionality may be stored within memory 703 or mass storage device 707 for execution by a processor such as CPU 701 in some embodiments. The operating system on the computing device may be MS DOS™, MS-WINDOWS™, OS/2™, UNIX LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A cluster file replication system, comprising:
a plurality of controllers forming a cluster of controllers, each controller of the cluster able to access a filesystem having a plurality of files including a system database having state information of the cluster, each controller of the cluster further including one or more service agents that is able to:
set up one or more objects that react to the state information and coordinate replication of changes to the files, the system database and the state information from a master controller in the cluster to follower controllers in the cluster, wherein the one or more objects on each of the follower controllers is supportive of the follower controllers receiving the changes from the master controller but is disabled from initiating the replication of changes.

2. The cluster file replication system of claim 1, wherein:
each of the service agents has access to a file replication library from which the service agent instantiates the one or more objects.

3. The cluster file replication system of claim 1, wherein:
one of the one or more objects comprises a periodic replication object to receive one or more notifications regarding changes in the filesystem and to issue a synchronize request responsive to receiving the one or more notifications and expiration of a time interval.

4. The cluster file replication system of claim 1, wherein:
one of the one or more objects comprises a responsive replication object to receive notifications regarding changes in the filesystem and to issue a synchronize request responsive to receiving such a notification.

5. The cluster file replication system of claim 1, wherein the state information comprises:
indications of which controllers are members of the cluster; and
for each controller that is a member of the cluster, an indication of whether the controller is a master or a follower.

6. The cluster file replication system of claim 1, wherein to set up an object, a service agent of the one or more service agents registers with the filesystem one or more files or directories of interest to the service agent so that the filesystem sends a notification to the object regarding changes of the one or more files or directories.

7. The cluster file replication system of claim 1, wherein:
when the state information indicates the one or more service agents are on the master controller, and when a further controller joins the cluster, the one or more service agents of the master controller update the state information in the system database of the master controller to indicate the further controller joining membership in the cluster as a follower, wherein the state information is propagated from the master controller to all other controllers in the cluster.

8. A tangible, non-transitory, computer-readable media having instructions thereupon which, when executed by one or more processors in a cluster of controllers, cause the one or more processors to perform a method comprising:
writing, by one controller in the cluster, state information to a system database of the one controller to record that the one controller is a master controller;
establishing, by one or more service agents of a given controller that reacts to state information, one or more objects in the given controller, the given controller being a member of the cluster of controllers;
coordinating, by one or more objects established in the master controller and enabled in reaction to the state information, replication of change to at least one of files, the system database or the state information from the master controller to follower controllers, wherein one or more objects on each of the follower controllers supports:
receiving the replication of change from the master controller on each of the follower controllers; and
disabling initiating the replication of change on each of the follower controllers in reaction to the state information on each of the follower controllers.

9. The tangible, non-transitory, computer-readable media of claim 8, wherein the method further comprises:
instantiating the one or more objects from a file replication library.

10. The tangible, non-transitory, computer-readable media of claim 8, wherein the establishing one or more objects includes instructing a periodic replication object to issue a synchronize request to a filesystem responsive to receiving one or more notifications regarding changes in the filesystem and completion of a time interval, when the periodic replication object is on the master controller.

11. The tangible, non-transitory, computer-readable media of claim 8, wherein the establishing one or more objects includes instructing a responsive replication object to issue a synchronize request to a filesystem responsive to receiving a notification regarding changes in the filesystem, when the responsive replication object is on the master controller.

12. The tangible, non-transitory, computer-readable media of claim 8, wherein the state information indicates whether a controller is a member of the cluster and whether the controller is a master or a follower.

13. The tangible, non-transitory, computer-readable media of claim 8, wherein the method further comprises:
registering to a filesystem one of the one or more objects and one or more files or directories of interest to a service agent, so that the filesystem sends notification of a change in the one or more files or directories of interest to the one object.

14. The tangible, non-transitory, computer-readable media of claim 8, wherein the method further comprises:
writing, by a service agent on the master controller, updated state information to the system database of the master controller to indicate a further controller joining the cluster as a follower; and
propagating the updated state information from the master controller to all other controllers in the cluster, via the one or more objects established in the master controller coordinating the replication of change.

15. A method for cluster file replication, performed by controller members of a cluster, comprising:

updating, by a controller that is a member of the cluster, state information in a system database of the controller to indicate the controller is a master controller;

establishing, by one or more service agents of a given controller that reacts to the state information, one or more objects in the given controller, the given controller being a member of the cluster;

coordinating, by one or more objects in the master controller that are enabled in reaction to the state information, replication of changes to files, the system database and the state information from the master controller to follower controllers; and disabling, by one or more objects in each of the follower controllers in reaction to the state information, initiation of the replication of changes to the files, the system database and the state information by the one or more objects in each of the follower controllers.

16. The method of claim 15, wherein the establishing the one or more objects in the controller comprises instantiating the one or more objects from a file replication library of the controller or of each of the one or more service agents.

17. The method of claim 15, wherein the establishing the one or more objects in the controller comprises instructing a periodic replication object to issue a synchronize request to a filesystem reactive to the state information indicating the controller is the master controller and responsive to receiving one or more notifications regarding changes in the filesystem and expiration of a time interval.

18. The method of claim 15, wherein the establishing the one or more objects in the controller comprises instructing a responsive replication object to issue a synchronize request to a filesystem reactive to the state information indicating the controller is the master controller and responsive to receiving a notification regarding changes in the filesystem.

19. The method of claim 15, wherein the establishing the one or more objects in the controller comprises registering the one or more objects, and one or more files or directories of interest to the one or more service agents, to a filesystem, to request that the filesystem send notification to the one or more objects of change of the one or more files or directories of interest.

20. The method of claim 15, further comprising:

updating, by a service agent on the master controller, the state information in the system database of the master controller regarding membership of a further controller as a follower in the cluster, responsive to the further controller joining the cluster; and replicating the state information from the master controller to all other controllers in the cluster, using the coordinating by the one or more objects set up in the master controller.

* * * * *